United States Patent [19]

Reed et al.

[11] 4,337,289
[45] Jun. 29, 1982

[54] WATER RELEASE TRANSFER

[76] Inventors: Kenneth J. Reed, 33 Carlysle Square, London, S.W.3, England; Alan L. Lythgoe, 25 Sene Park, Hythe, Kent, England

[21] Appl. No.: 157,083

[22] Filed: Jun. 6, 1980

Related U.S. Application Data

[63] Continuation of Ser. No. 956,725, Nov. 1, 1978, abandoned.

[30] Foreign Application Priority Data

Nov. 2, 1977 [GB] United Kingdom ............... 45588/77

[51] Int. Cl.$^3$ .......................... B32B 3/18; B44C 1/16
[52] U.S. Cl. .................................... 428/195; 156/234;
156/240; 427/43.1; 427/149; 428/199; 428/202;
428/204; 428/207; 428/211; 428/335; 428/336;
428/350; 428/914; 430/14; 430/18; 430/253;
430/256; 430/281; 430/326

[58] Field of Search ............... 156/234, 240, 249, 272,
156/277; 282/27.5; 427/43.1, 147, 149;
428/195, 199, 207, 211, 350, 914, 202, 204, 335,
336; 430/14, 18, 253, 256, 271, 281, 291, 326

[56] References Cited

U.S. PATENT DOCUMENTS 4,022,926  5/1977  Keough et al. ...................... 428/41

Primary Examiner—Bruce H. Hess
Attorney, Agent, or Firm—William E. Jackson

[57] ABSTRACT

A method of manufacturing a water-release transfer is disclosed in which a design in a photopolymerizable ink is applied to a substrate having a water-soluble release coating and the design is subjected to photopolymerizing radiation, e.g. ultra-violet light, to cause the ink to polymerize to a solid state. Preferably the ink comprises a mixture of a liquid unsaturated monomer and a viscous or solid prepolymer, and one or both of the monomer and prepolymer contain acryloyl or methacryloyl groups. The invention includes water-release transfers manufactured using photopolymerizable inks.

15 Claims, No Drawings

WATER RELEASE TRANSFER

RELATED APPLICATIONS

This application is a continuation of application Ser. No. 956,725, filed Nov. 1, 1978, now abandoned.

BACKGROUND OF THE INVENTION

1. Field of the Invention

This invention relates to water-release transfers. The characteristic of such transfers is that a transferable design layer is released from the water-release layer of a supporting sheet by the application of water which softens the release layer and allows the design layer to be removed from the support and transferred to a receiving surface.

2. Description of the Prior Art

There are two distinct types of such transfers which are termed herein water-slide and reverse-fixing transfers. Water-slide transfers consist of a design layer printed positive onto the water-release layer of the support sheet which is usually a water permeable paper sheet. The transfers are applied by immersion in water and sliding off the released design layer onto the receiving surface, where it is adhered thereto by the material of the release-layer.

Reverse-fixing transfers are printed negative, i.e. in reverse, on the water-release layer of the support substrate and the fixing adhesive is applied as a layer over the design layer or as a layer on the receiving surface. The transfer sheet is applied design side down onto the receiving surface to produce adhesive bonding and the support substrate released and removed by applying water.

Water-release transfers of the prior art have relied on two types of ink to print the design layer, one drying mainly by oxidation and the other exclusively by evaporation. Due to the moisture sensitive nature of the water-release layer on the transfer paper, which is an indispensable component of the system, drying of both the above types of ink must be carried out at room temperature and controlled relative humidity otherwise the transfer paper curls severely and shrinks if subjected to heat in the drying process or a substantial reduction in relative humidity. Consequently it is essential to aircondition the entire plant producing water-release transfers to this humidity to maintain sheet dimensions.

Although water release transfers are widely known and have been used for many years for the decoration labelling and marking of all types of equipment and components many of these applications have declined due to the above problems and the high cost of production.

A further problem which occurs with water release transfers, particularly the water-slide type, is due to the requirement that all the transfer design elements must be tied together by an overall transfer layer having sufficient film strength to avoid fracture or distortion during transfer so that all the design elements are transferred together in the same spatial relationship in which they were printed. This has been achieved by printing an overall clear, white or other coloured transfer layer having the necessary film strength which holds together all the overprinted design elements.

Such a transfer layer necessarily must have a substantial dry film thickness, usually 8–50 micrometers to provide the necessary film strength and flexibility and this requirement implies a correspondingly thick wet film and even longer drying times.

SUMMARY OF THE INVENTION

According to the present invention there is provided a method of manufacturing a water-release transfer which comprises applying at least one design layer in a photopolymerisable ink to a substrate having a water-soluble release coating and subjecting the layer to actinic radiation or electron beam radiation, whereby the ink polymerises to a solid state. In this specification the term "photopolymerising radiation" is used to describe any kind of radiation which is effective in initiating or assisting polymerisation of the ink.

According to a further aspect of the present invention there is provided a water-release transfer which comprises a design in a photopolymerised ink supported on a substrate and having an intervening water-soluble release layer between the substrate and the design.

DETAILED DESCRIPTION OF THE INVENTION

The present invention is applicable to the manufacture of both types of water-release transfers described above, i.e. the water-slide type and the reverse-fixing type and any means may be used to attach the transfer layer to the receiving surface including mechanical fixing, electrostatic, magnetic, air pressure, suction and adhesives. Adhesives include:

no-tack, low-tack and high-tack pressure sensitive,
heat-fix, solvent-fix and water fix,
liquid polymerising adhesives,
self-seal adhesives,
photopolymerising pressure sensitive adhesives,
adhesive receiving substrates,
delayed tack heat-fix adhesives,
encapsulated adhesives, One preferred class of pressure-sensitive adhesives are described in British Pat. No. 1,491,678.

Generally speaking it is convenient to apply the design to a conventional substrate for water release transfers which is usually a water permeable paper coated with a water soluble natural or synthetic polymer such as dextrin. It will be appreciated that other types of flexible substrates and water-release coatings of other kinds may be used as alternatives.

The transferable design may comprise one or more clear, or coloured (which includes white and black) photopolymerised ink layers. In the case where a plurality of ink layers are superimposed to form a composite design, the inks are applied sequentially and each layer is subjected to a degree of photopolymerising radiation which is at least sufficient to polymerise the layer to the extent necessary to accept overprinting without picking or smudging before application of the succeeding layers. It is not necessary to fully photopolymerise the intermediate layers before applying the subsequent layers.

It is not essential that all the ink layers are formed from photopolymerisable inks and inks which dry by other conventional mechanisms such as evaporation or oxidation may be used in conjunction with the photopolymerisable inks to build up a multilayer transfer.

Multilayer water-slide transfers usually consist of one or more coloured design layers printed onto an overall clear or coloured backing layer or the overall clear layer may be applied over the previously printed design layers. Both single-layer and multi-layer water-slide transfers require the overall layer to have sufficient tensile strength, flexibility and resistance to stretching to be transferred without distortion. When a transfer layer is required having such a tensile strength, flexibility and resistance to stretching, it is preferably produced by photopolymerisation.

Tensile strength, flexibility and resistance to stretching are dependent on layer thickness and on suitable chemical composition of the layer. Both of these requirements are readily controlled by photopolymerised inks of the invention. Photopolymerisable inks are free from volatile materials or have only a low concentration of these. Generally a layer thickness range of 8–50 micrometers and more usually 10–35 is adequate for transfers of different sizes, designs and for application to different receiving substrates and any value in this thickness range is readily produced by screenprinting.

The liquid photopolymerisable inks may be applied by any other printing, coating or painting process such as gravure, litho, letterpress, roller coating, Mayer bar coating, brushing and spraying. Sufficient dry thickness is built up by applying multiple layers for example four litho ink layers of 2.0 micrometers each with intermediate exposure to the radiation between each impression as described to produce a layer thickness of 8 micrometers.

Each coloured design layer may contain colouring matter which is dissolved or dispersed in the liquid ink or applied as a powder to the surface of the ink while still liquid by the bronzing process. Of course those coloured design layers which do not need to possess tensile strength are printed as a single layer at conventional thickness. The following description is given of the manufacture and application of preferred photopolymerisable inks for use in the present invention. For further information regarding these preferred inks reference is made to copending patent application No. 926,077 (Reed and Lythgoe, filed July 19th, 1978), now U.S. Pat. No. 4,286,008.

Photopolymerisable inks consist of ethylenically unsaturated materials and, tensile strength, stretch resistance and flexibility are partly controlled by the cross-link density of the photopolymerised ink. The greater the cross-link density, the higher the tensile strength and stretch resistance and the lower the flexibility.

Crosslink density is mainly determined by the number of photopolymerisable ethylenically unsaturated groups per molecule of the materials used in the liquid ink, termed functionality. One ethylenic group per molecule cannot crosslink and gives a soft and very extensible layer. An average of two ethylenic groups per molecule generally gives suitable properties and three ethylenic groups gives high cross-link density values which may lead to brittleness. However stretch and flexibility depend partly on other chemical composition properties of the materials and the effect of functionality is given here only as a general guide. A mixture of materials with one, two and three ethylenic groups is a useful means of achieving a suitable crosslink density which will then be an average value. The mono-ethylenic material can be compared to a plasticiser in conventional inks since it acts as a flexibilizing agent. The di-ethylenic material provides the main component and the tri-ethylenic material is added to increase the stretch resisting properties to precisely the desired value.

Satisfactory flexiblity requires an elongation at break-point of over 0.5% with preferred values of 2% or higher and an elongation of 15% may be required for complex designs applied to irregular substrates. Elongation properties are achieved by using flexible chemical groups in the photopolymerisable materials such as polyalkyl, polyether and polyester groups, combined with control of the crosslink density.

Photopolymerisation is produced by exposure to radiation such as ultra-violet radiation or a mixture of ultra violet and visible radiation or accelerated electron beam radiation. Ultra violet radiation of high intensity is conveniently produced by medium pressure mercury vapour discharge lamps operated at 80 watts per centimeter or more in fused silica or quartz tubes. Other useful sources of intense ultra violet are xenon discharge lamps and xenon flash lamps and swirl flow plasma radiation arcs.

Such radiation has an infra-red component which causes heating of the water-release transfer support sheet but by selecting extremely fast photopolymerising liquid inks which require very brief exposure to the radiation, curl or shrinkage of the support sheet is avoided.

Such fast photopolymerising inks are obtained by photoinitiated vinyl addition polymerisation of monomers and prepolymers containing terminal or pendant acryloyl or methacryloyl groups: $CH_2=CR-CO-$ where R is H or $CH_3-$ or other group such as $-CN$ respectively. The acryloyl group is faster polymerising than the methacryloyl group and reference below to acryloyl groups includes methacryloyl groups.

The liquid ink must also possess suitable viscosity and tack values for good printability, and these can be readily achieved together with all the other requirements such as low toxicity and where appropriate weather resistance and ceramic firing properties by controlling the molecular weight and composition of the photopolymerisable materials. Conveniently a material of high viscosity is used in admixture with a liquid of lower viscosity to control viscosity, tack values and other properties.

Low viscosity and liquid photopolymerisable materials are monomers, that is materials which do not contain polymeric groups in the molecule or only very short repeating units and suitable materials are acrylate esters of mono, di, tri and tetrahydric alcohols. Monomers are preferred which have very low volatility with low skin and eye irritancy and these properties are generally obtained with monomers of higher molecular weight. Acrylate esters of the following alcohols are generally suitable and are given by way of example:

Monohydric alcohols: 2 phenoxyethanol, 2 phenoxyethoxyethanol and hydrogenated derivatives. Dihydric alcohols: tripropylene glycol, bisphenol A, hydrogenated bisphenol A and hydroxethyl ethers and hydroxypolyethoxyethers of bisphenol A and hydrogenated bisphenol A.

Trihydric alcohols: trimethylolpropane.

Tetrahydric alcohols: pentaerythritol.

Polyhydric alcohols: dispentaerythritol.

All hydroxyl groups may be esterfied or one or more groups may be left unesterfied to provide materials with controlled hydrophilic-lyophilic balance for offset litho inks and interfilm adhesion. Free hydroxyl groups may be further reacted or partially reacted with isocyanates to produce urethanes.

High viscosities are produced by photopolymerisable materials in which there is a polymeric component in the molecule termed herein prepolymers. These materials range from highly viscous liquid to solids and have molecular weight range of about 250–5000. The terminal or pendant acryloyl groups can be incorporated in polymeric molecules such as acrylated urethanes, polyepoxides, polyethers, polyesters, and polyaminoformaldehyde.

Preferably 2–6 acryloyl groups are incorporated in the polymer molecule and this can be carried out for example by reacting acrylic acid or acryloyl chloride with a polymer or polymerisable material containing free hydroxyl groups. Alternatively such groups can be incorporated by reaction of a hydroxylalykyl acrylate with a polymer or polymerisable material containing isocyanate, epoxide, carboxylic acid, anhydride or aminoformaldehyde groups.

For example an acrylated epoxy prepolymer is prepared by reacting Bisphenol A polyglycidyl ether having terminal epoxide groups with acrylic acid which open the oxirane ring and the hydroxyl groups so produced can be further reacted with acryloyl chloride to introduce additional acryloyl groups.

Acrylated urethane prepolymers are prepared for example by reacting hydroxypropyl acrylate with hexamethylene di-isocyanate or polyisocyanates. Alternatively acrylated urethane polyethers and acrylated urethane polyesters are prepared by reacting excess of a di- or polyisocyanate with a polyether or polyester having free hydroxyl groups and then reacting this polymer containing free isocyanate groups with hydroxyalkyl acrylate.

Preferably the prepolymer is soluble in the monomer. To obtain the correct balance of properties more than one monomer and more than one prepolymer admixture are normally used in the inks. One or more photoinitiators are also dissolved or dispersed in the unsaturated materials at a concentration of 0.01–30% and more usually 1–10% based on the weight of unsaturated material to photoinitiate polymerisation when using ultra violet radiation or ultra violet plus visible radiation. Photoinitiators are not required when high energy accelerated electron beam radiation is used. The following are examples of photoinitiators: Ketones and derivatives such as benzophenone, 4,4'-dimethylaminobenzophenone, acetophenone, 2,2-diethoxyacetophone, halogenated benzophenone, benzil, benzil dimethyl acetal. Acryloin and derivatives such as benzoin, benzil dimethylacetate and benzoin isopropyl ether. Thio compounds such as thioxanthone, 2 chlorothioxanthane, benzoyl diphenyl sulphide, polynuclear quinones and derivatives such as benzoquinone chloranthraquinone. Chlorinated hydrocarbons such as hexachlorethane and diazo compounds including fluoroborate salt of diazonium compounds.

The effect of photoinitiators may be accelerated by a tertiary amine such as ethyl dimethylaminobenzoate or an amino acrylate polyer, preferably used in an amount of 0.1 to 10%, especially 0.5 to 2.5% by weight.

Other types of unsaturated monomers and prepolymers can be added to the main photopolymerisable materials listed above to participate in the photopolymersation such as N-vinylpyrrolidone, vinyl acetate, allyl and cinnamyl esters, acrylamide derivatives such as (N-isobutoxymethyl) acrylamide and triallylcyanurate. Unsaturated polyesters include maleate, fumarate, itaconate and citraconate esters of glycols.

Non-reactive polymers can also be dissolved or dispersed in the main photopolymerisable materials such as a high acid value polyester derived from mellitic anhydride to give alkali solubility or interfilm adhesion to the photopolymerised layer, or dispersed finely powdered polyvinylchloride or vinyl chloride-acetate copolymer which solvate during photopolymerisation to increase strength and flexibility. It is generally unnecessary to reduce viscosity by the addition of volatile organic solvents although a limited addition can be made, for example up to 20% of n-butoxyethanol.

Finally various other additives may be included in the inks such as pigments, fillers, flow agents, waxes which are well known to persons skilled in the art of printing inks.

Photopolymerisation can be subject to inhibition by atmospheric oxygen which affects mainly the outer surface of the transferable layer. This can lead to a reduction in film strength with thin transferable layers and oxygen inhibition is prevented in the invention by very high intensity focussed radiation using an elliptical reflector and by the use of poly-acryloyl unsaturated materials plus the most efficient photoinitiators and accelerators. If necessary photopolymerisation may also be carried out in a nitrogen atmosphere or by placing a transparent plastic film over the liquid ink during exposure, both of which reduce access by atmospheric oxygen.

Some water-release transfer sheets transmit long wavelength ultra violet radiation such as 365 mm and photopolymerisation can be carried out by reverse exposure that is by passing the radiation through the transfer sheet. When using inks with a high optical density such as a black ink with a density of 2.0 or more it is useful to use both reverse and direct exposure simultaneously or successively.

In an embodiment of the invention, oxygen inhibition of the transferable layer is deliberately arranged by selection of suitable acryloyl unsaturated materials, photoinitiators and control of radiation intensity to reduce the rate of photoinitiation to cause adhesiveness and tackiness in the outer surface of the photopolymerised transferable layer by formation of soft or tacky low molecular weight polymer species. By this means an extra adhesive layer is avoided in a reverse-fixing transfer.

Such surface adhesiveness is particularly easily achieved by reverse exposure, that is by passing radiation through the carrier sheet and release layer rather than by the normal direct exposure. The adhesiveness of a self-adhesive layer is increased when the outer surface is produced so as to have a high gloss since this increases the contact area to receiving substrates.

The components of the photopolymerisable composition are blended together to give the correct viscosity and speed of photopolymerisation to the liquid ink and suitable flexibility and film strength to the photopolymerised film. High tensile strength combined with flexibility as measured by elongation at breakpoint of the released film of 1–15% is suitable with an elongation of 0.5–20% for less exacting requirement.

The viscosity required for the various printing and coating processes is obtained by a suitable adjustment of the proportions of the high viscosity component, e.g. the acrylated polymer, and low viscosity component, e.g. the acrylic monomer. Also varying the molecular weight of the acrylated polymer has a marked effect on the viscosity of its solution in the liquid monomers.

Ink viscosity and rheology are also affected by the incorporation of pigments and extender powders. Suitable extenders which improve ink printing properties and do not reduce the rate of photopolymerisation include finely divided silica, talc and barium sulphate.

Some photoinitiators may exert a mild solvent action and assist in reduction of viscosity for example, benzophenone when used at a concentration of 5-10%. The photopolymerisation of ethylenically unsaturated polymers and monomers by ultra-violet radiation requires initiation of the polymerisation by a photoinitiator. The use of high energy radiation such as electron beam radiation consisting of a curtain of electrons accelerated by a very high voltage of 150,000-200,000 volts, does not require the use of a photoinitiator.

Other less preferred types of photopolymerisation compositions are described in U.K. Pat. Nos. 1,476,536 and 1,406,467.

Certain pigments such as carbon black and titanium dioxide reduce the rate of photopolymerisation so the concentration of these in the inks is limited and extra layers are applied when necessary each with exposure to polymerisation radiation. Alternatively pigments are used which have less effect on rate of photopolymerisation for example black iron oxide, finely powdered aluminium and, zinc sulphide, barium sulphate, lithopone and antimony oxide. For decoration and marking of ceramics, vitreous enamels, glass and similar substrates, frits, powdered glazes and inorganic pigments are dispersed in the photopolymerisable liquid ink medium and after printing and photopolymerisation of the colour layers a clear layer is overprinted and photopolymerised to increase film strength required for a water-slide transfer. After transfer and allowing the water to evaporate, the substrate is fired to burn away the organic constituents and fire the colour onto or with the substrate.

The following Examples are given to illustrate the invention and the manner in which it may be carried into effect.

EXAMPLE 1

A clear photopolymerisable screen ink having good film strength, stretch-resisting properties and flexibility has the following composition:

| | | |
|---|---|---|
| 1. Urethane acrylate prepolymer | 57.0 | |
| 2. 2-Phenoxyethylacrylate | 20.0 | |
| 3. Trimethylopropane Triacrylate | 14.5 | |
| 4. Benzil dimethyl acetal | 4.5 | |
| 5. Benzophenone | 3.0 | |
| 6. Liquid Acrylic polymer | 1.0 | |
| | 100.0 | |

A small quantity of 2-butoxyethanol can be added to adjust viscosity to about 15 poises.

The prepolymer (1) containing 3 acryloyl groups per molecule is dissolved in the liquid monomer (2) and the photoinitiators (4 and 5) and flow agents (6) added with high speed stirring. The crosslinking monomer (3) is added progressively and the optimum film strength, stretch-resisting properties and flexibility is tested by photopolymerisation of a layer. The composition is applied by screenprint onto water-release transfer paper using monofilament polyester mesh with 90 meshes per centimeter to give a layer thickness of 22 micrometers which was photopolymerised by passage at 60 meters per minute under two tubular mercury vapour lamps operated at 80 watts per centimeter in elliptical aluminium reflectors and the sheets then immediately cooled by high velocity air jets.

The transfer sheets are stacked after photopolymerisation without curl and without shrinkage. The transfer layer is released by application of water which causes the gum layer to soften so the transfer layer can be slid off onto the receiving surface, pressed down, allowed to dry and acquire adhesion by evaporation of the water between transfer and receiving surface.

When the receiving substrate is a ceramic or glass, firing in a kiln after using conventional non-photopolymerisable printing inks including ceramic inks, and drying carried out in the usual manner. Preferably photopolymerisable design inks are used and are dried by passage through the same ultra violet radiation equipment at conveyor speeds of 30-60 meters per minute. The transfer sheets are obtained free from excessive curl and with good print register.

Since all the design colours can be printed and dried in quick succession, it is not necessary to work in closely controlled humidity.

A solvent-fix adhesive transfer is prepared by printing the clear transfer layer and printing the coloured design layers in reverse. The adhesive may be, for example, a solution of alcohol soluble cellulose nitrate with plasticiser in p-ethoxyethanol solvent. After evaporation of solvent, the dry, non-blocking adhesive layer can be activated when the layer is to be applied by the application, for example of ethanol or p-ethoxyethanol or p-butoxyethanol. After application to the receiving surface and drying in situ the transfer paper is released and removed by applying water. It is possible to simultaneously activate the adhesive and release the transfer from the paper by immersing the transfer sheet in a water-solvent mixture such as 40% butoxyethanol in water.

A heat-fix transfer is prepared by replacing the solvent-fix adhesive described above with, for example, polyvinyl acetate or a polyamide dissolved in solvent which after evaporation gives a dry non-blocking adhesive layer. The transfer adhesive is activated by heating, e.g. to 90° C. while applied to the receiving substrate. After cooling the transfer paper is released by application of water as before.

A varnish-fix transfer is prepared by printing the design in reverse as described above and applying an oxidising oil varnish to the substrate allowing solvent to evaporate to a tacky state, applying the transfer layer, leaving overnight to harden and releasing the transfer paper with water.

With the type of transfer described above in which the designs are printed in reverse and the transfer paper released after the adhesive has been applied to the substrate and dried, a faster release is obtained by using so-called duplex paper which is a 2 ply sheet and the thicker outer sheet is stripped from the thin tissue carrying the gum layer and the transfer layer before applying water, so that very fast water penetration occurs into the gum layer.

EXAMPLE 2

A black photopolymerisable ink with the following composition and prepared by dispersion on a triple roll mill and was printed through a plain weave monofilament polyamide mesh having 140 meshes per centimeter and a filament diameter of 30 micrometers, using an indirect photostencil:

| | |
|---|---|
| 1. Urethane acrylate prepolymer | 40 |

-continued

| | |
|---|---|
| 2. Di-acrylate ester of di-hydroxyethyl ether of bishpenol A | 36 |
| 3. Monoacrylate ester of mono-hydroxyethyl ether of bisphenol A | 8 |
| 4. Carbon black | 3.8 |
| 5. Benzil dimethyl ketal | 4 |
| 6. Benzophenone | 5.7 |
| 7. Methylthiozanthone | 0.5 |
| 8. 4-Dimethylaminoethylbenzoate | 2 |
| | 100.0 |

The liquid ink is based on monomers 2 and 3 of high molecular weight having extremely low volatility and very low skin irritancy and are essentially non-toxic and was printed on water-release decal paper and photopolymerised as in Example 1.

EXAMPLE 3

A white photopolymerisable screen ink has the following composition and was prepared by dispersion on a triple roll mill:

| | |
|---|---|
| Urethane acrylate prepolymer | 35 |
| 2-Phenoxyethyl acrylate | 9 |
| Tripropylene glycol diacrylate | 16 |
| Benzophenone | 4 |
| Benzildimethylketal | 4 |
| Antase titanium dioxide | 15 |
| Lithopone | 17 |
| | 100 |

This was printed as in Example 2 to give a white transfer layer which is readily transferred without breaking or distortion.

EXAMPLE 4

The photopolymerised white transfer layer of Example 3 printed onto water-release decal paper was overprinted with a multicolour design picture using four colour halftone offset litho printing with the following set of inks which were each photopolymerised after printing:

Yellow

| | |
|---|---|
| Colour Index Pigment Yellow 13 | 15 |
| Acrylated epoxy prepolymer | 20 |
| Pentaerythritol triacrylate phenyl carbamate | 60 |
| Benzil dimethyl acetal | 3.5 |
| 2,2-Diethoxyacetophenone | 1.5 |
| | 100 |

The yellow pigment is dispersed in the mixture of the ethylenically unsaturated material in a triple roll mill and the photoinitiators are added as a dispersion in the remainder of the material in subdued light.

Magenta

This was prepared similarly replacing the yellow pigment with 18 parts of Colour Index Pigment Red 57.

Cyan

This was prepared with 16 parts of Colour Index Pigment Blue 15.

Black

This was prepared with 18 parts of Carbon black and 1 part of Colour Index Pigment Blue 15.

The inks were printed in the above sequence and tack-graded by addition of a small quantity of trimethylol propane tri-acrylate.

We claim:

1. A water-release transfer which comprises a transferable design formed in a photopolymerized ink supported on a flexible water-permeable carrier substrate and having an intervening water-soluble release layer, which provides a surface capable of being wetted by said ink while in its unpolymerized state, between the substrate and the design, said design comprising a solid film of flexible and stretch-resisting, cross-linked polymer produced by photopolymerization of a liquid ink printed on the substrate and consisting essentially of a blend of rapidly photopolymerized, ethylenically unsaturated monomer and prepolymer containing pendant or terminal acryloyl or methacryloyl groups wherein the prepolymer has about 2 to 6 acryloyl or methacryloyl groups per molecule whereby on photopolymerization a cross-linked and flexible film is produced.

2. A transfer according to claim 1 wherein the liquid ink contains at least one photopolymerizable monomer the main component of which contains 2 acryloyl or methacryloyl groups per molecule.

3. A transfer according to claim 1 wherein the ink includes a prepolymer which is an acrylated or methacrylated urethane prepolymer which contains about 2 to 6 acryloyl or methacryloyl groups per molecule.

4. A transfer according to claim 1 wherein the ink contains a monomer which is a mono or poly acrylate.

5. A transfer according to claim 1 wherein the ink contains one or more prepolymers having a molecular weight of 250 to 5000.

6. A transfer according to claim 1 wherein the ink comprises a mixture of a high viscosity liquid or solid photopolymerisable prepolymer and a low viscosity liquid monomer or low molecular weight prepolymer.

7. A transfer according to claim 1 wherein the design consists essentially of a plurality of layers including a cross-linked, photopolymerised layer and one or more additional layers.

8. A transfer according to claim 7 wherein all of the individual layers making up the design are photopolymerized.

9. A transfer according to claim 1 in which said liquid ink contains a photoinitiator and is photopolymerized by exposure to ultra-violet light.

10. A transfer according to claim 1 wherein the liquid ink is photopolymerised by exposure to electron beam radiation.

11. A transfer according to claim 1 in which the design layer is coloured by pigments or dyes which do not inhibit fast photopolymerisation when exposed to actinic radiation.

12. A transfer according to claim 11 wherein the design layer contains a pigment selected from zinc sulfide, barium sulfate, black iron oxide, finely powdered aluminium and antimony oxide and mixtures of two or more of such pigments.

13. A transfer according to claim 1 wherein the design layer is from 8 to 50 micrometers thick.

14. A transfer according to claim 1 wherein the design is coated with an adhesive.

15. A transfer according to claim 1 wherein the photopolymerized design has a elongation at break between 0.5 and 20%.

* * * * *